2 Sheets—Sheet 1.

J. T. GORSLINE.
Apparatus for Handling Hides.

No. 199,534. Patented Jan. 22, 1878.

Attest.
R. E. White
Louis S. Hahn

Inventor.
Joshua T. Gorsline
pr R. L. Osgood,
Atty.

2 Sheets—Sheet 2.

J. T. GORSLINE.
Apparatus for Handling Hides.

No. 199,534. Patented Jan. 22, 1878.

Attest.
R. E. White
Louis O'Hahn

Inventor:
Joshua T. Gorsline,
per R. F. Osgood,
Atty.

N. PETERS, PHOTO-LITHOGRAPHER, WASHINGTON, D. C.

UNITED STATES PATENT OFFICE.

JOSHUA T. GORSLINE, OF PARMA, NEW YORK.

IMPROVEMENT IN APPARATUS FOR HANDLING HIDES.

Specification forming part of Letters Patent No. 199,534, dated January 22, 1878; application filed November 7, 1877.

*To all whom it may concern:*

Be it known that I, JOSHUA T. GORSLINE, of Parma, in the county of Monroe and State of New York, have invented a certain new and useful Improvement in Apparatus for Handling Hides, Skins, and other materials in vats; and I do hereby declare that the following is a full, clear, and exact description of the construction and operation of the same, reference being had to the accompanying drawings, in which—

Figure 1:
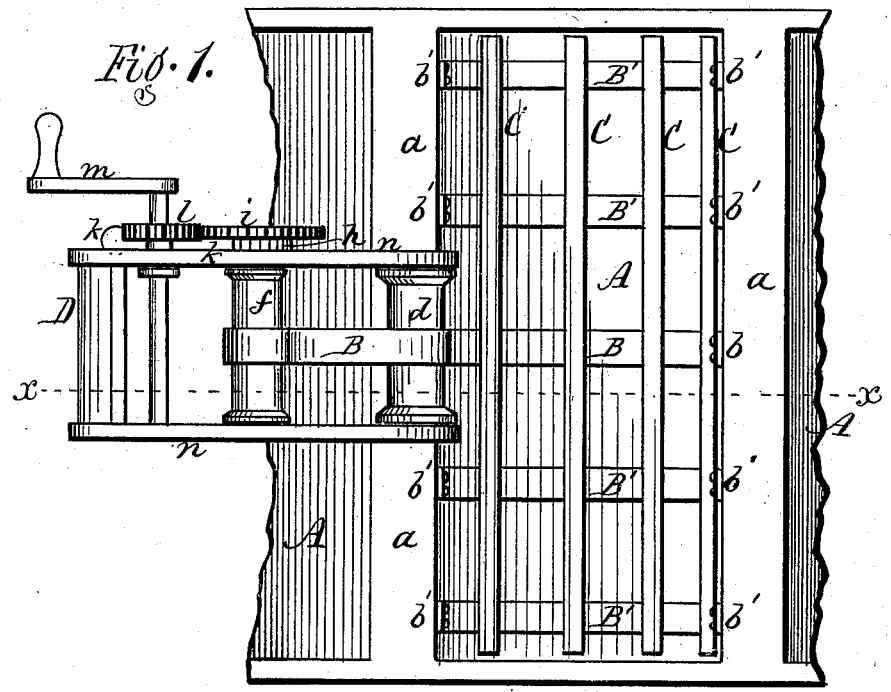
Figure 2:
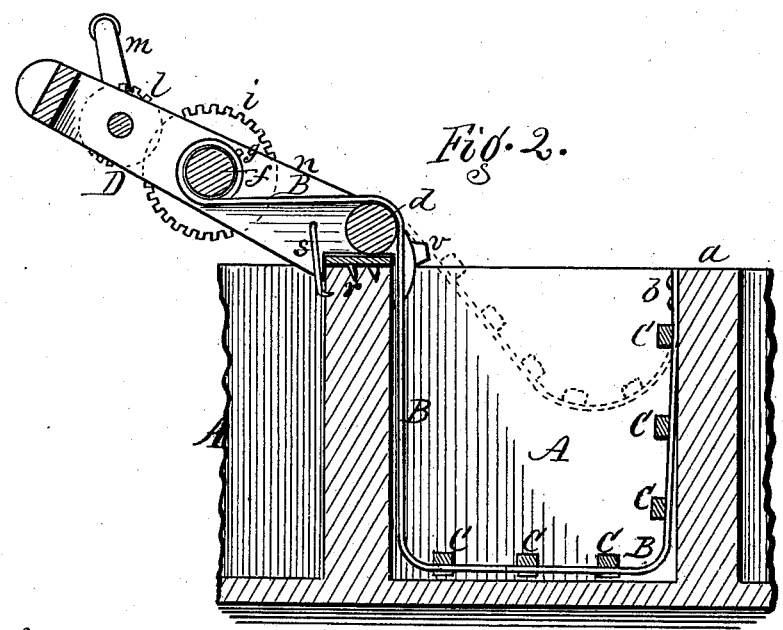
Figure 3:
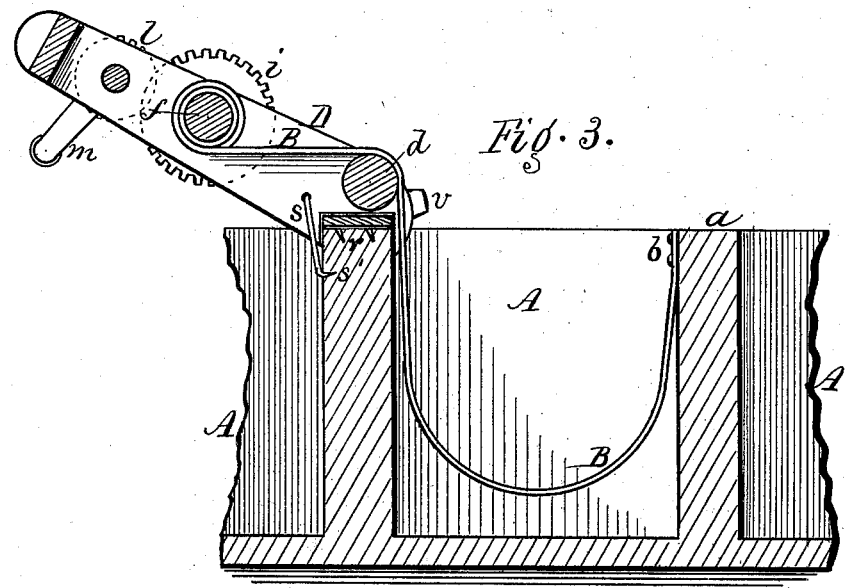
Figure 4:
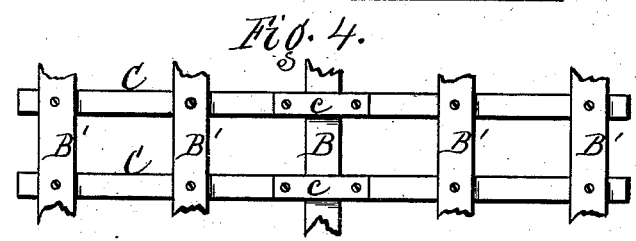
Figure 5:
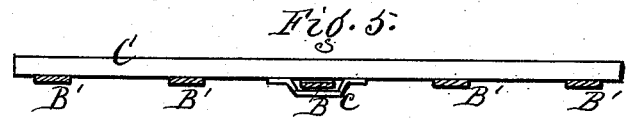
Figure 6:
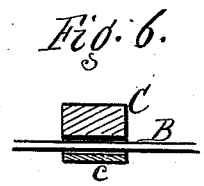
Figure 7:
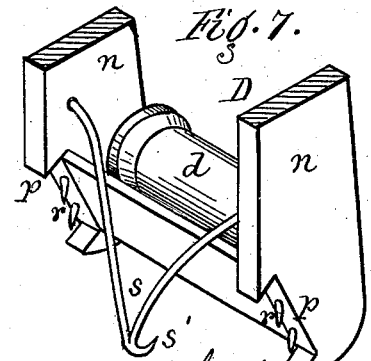

Figure 1 is a plan of a tanner's vat, showing my improvement applied thereto. Fig. 2 is a vertical section in line $x\ x$ of Fig. 1. Fig. 3 is a view similar to Fig. 2, but showing the center strap divested of the slats. Figs. 4, 5, and 6 are views of the slats and their connections, forming the rack, which rests in the vat. Fig. 7 is a detail view, showing the means for connecting the hoisting device with the vat.

My improvement relates to means for handling hides, skins, &c., in vats, and is particularly adapted to tanner's use, where hides and skins have to be raised daily from the vats in order to produce proper action of the tanning-liquid.

The invention consists in the construction and arrangements of parts, hereinafter more fully described and definitely claimed.

A A A represent a series of vats of ordinary form, having the usual alleys $a\ a$ between them. B is a central strap, cord, rope, chain, or other flexible connection, which is attached fast at one end to one side of the vat, as shown at $b$, the other end passing down into the vat, thence across its bottom, and then rising on the opposite side, where it connects with the hoisting-machine. B′ B′ B′ are similar straps, cords, ropes, chains, or other flexible connections, resting in the vat in a similar way, but attached either at both ends permanently to the opposite sides of the vat, as shown at $b'\ b'$, or at one end only, on the same side as the center-strap B. All these connections have sufficient slack to underlie the contents of the vat when lowered to the bottom.

C C C are slats resting longitudinally in the vat, and forming the rack. They are attached to the straps before described, a portion lying on the farther vertical side of the vat opposite the hoisting-machine, and a portion in the bottom of the vat, but leaving the side of the vat next the hoisting-machine free of the slats, as shown in Fig. 2.

The slats are permanently attached to the side straps B′ B′ by nails or other means; but all the bottom slats and a portion or all of the side slats are attached to the center-strap B by loose connections, so that the slats can slide upon the center-strap, or the center-strap can move freely beneath the slats without trouble. The means shown are loops or eyes $c\ c$, Figs. 4, 5, and 6, attached to the bottom of the slats, through which the center-strap passes.

D is the hoisting-machine, consisting of a rectangular frame having side pieces $n\ n$, in which are located a pulley, $d$, and winding-roller $f$. The end of the center-strap B passes over the pulley $d$ and under the winding-roller $f$, being connected with the latter by hooking onto a spur or stud, $g$, or by any other means by which it is readily connected and disconnected. As the winding-roller is turned the rack will be drawn up, raising the contents of the vat.

The pulley $d$ is located at the extreme lower end of the frame, projecting over the vat sufficiently to prevent the binding of the strap as it is raised. The pulley and the winding-roller are so relatively arranged that the strap passes from the pulley to the roller in a horizontal, or nearly horizontal, direction, as shown.

$h$ is a ratchet-wheel, and $i$ a gear-wheel on the end of the winding-roller $f$. $k$ is a pawl, which engages with the ratchet-wheel, for holding the material at any position as it is raised from the vat. $l$ is a pinion, which engages with the gear-wheel $i$, and on the shaft of this pinion is a crank, $m$, by which motion is imparted to the machine.

The lower ends of the side pieces $n\ n$ are angular or beveled, to rest on top of the alley $a$ and present the hoisting-machine in the proper position for operation. In the lower ends of these side pieces are inclined studs or spurs $r\ r$, which stand forward and strike into the top of the alley, serving the purpose of holding the hoisting-frame and preventing it from being drawn forward into the vat by the strain in raising the load. Sockets or notches *p p* may be formed at the ends of the side pieces for embracing the top of the alley; but as alleys are of various widths, these sockets may be dispensed with, and the ends of the frame simply rest on top of the alley. If desired, also, side lugs or flanges may be used at the bottom of the frame, through which pass screws into holes in the alley, the upper ends of the screws having cranks by which they are turned.

*s* is a dog or brace hung in the opposite sides of the frame, just in the rear of the pulley *d*, and hanging down in the vat next behind that in which the operation is performed. This brace has a sharp spur or point, *s'*, at its lower end, which is driven into the wood of the alley in the rear vat. Standing nearly vertical, and the spur holding in the wood, it acts as a brace or stay to prevent the hoisting-machine from being drawn over by the strain. This, together with the angular spurs in the bottom of the frame, always retains the hoisting-machine in proper place.

The operation is as follows: The hides or skins are placed in the vat, resting upon the straps. When it is desired to raise them the strap B is wound up, which gradually raises the pack. As it approaches the top the slats next the hoisting-machine gradually slide down upon the center-strap B, carrying the pack with them in the angular space toward the rear side of the vat, as shown by dotted lines in Fig. 2. In this condition the operator, standing upon the alley, can easily seize them and throw them out. If the provision of the sliding of the slats on the center-strap were not made, the slats would strike the frame and stop the machine. By sliding down they remain within the space of the vat, and do not interfere with the action. The slack of the side straps B' B' allows this sliding action to take place. To make the action surer, stops *v v* are used on the lower end of the hoisting-frame for the slats to strike against as they come up. The rack is particularly adapted for handling kips and skins. For handling sides, the single center-strap B (shown in Fig. 3) may be used, the sides being laid across it, the backs standing toward the hoisting-machine. In raising the pack the inclined position it assumes has a tendency to wash off the sediment or bloom, presenting it in a cleaner form than where a vertically-acting rack is used, and presenting the same advantage, in this respect, as in handling by a hook in the ordinary way.

This invention is applicable to tanning, soaking, liming, and bating of hides and skins, and also to various other uses where materials are to be raised from vats. Two of the hoisting-straps B may be used, one at each end of the vat. This is particularly useful in graded tan-yards.

What I claim as new is—

1. In an apparatus for raising materials from vats, the flexible straps or connections B, in combination with a vat, fastened at one end to the top of the vat, extending down through and along the bottom of the vat, underlying the contents thereof, and rising upon the opposite side, the other end being free for the application of power to raise the contents of the vat, as shown and described, and for the purpose specified.

2. The combination, with the hoisting-machine D, of the flexible winding strap or straps B, flexible side straps B' B', and slats C C, the slats being arranged to slide upon the winding strap or straps, in the manner and for the purpose specified.

3. The combination, with the slats C C, of a winding strap or straps, B, passing loosely through eyes or loops of the slats, so that the slats can slide freely thereon, and side straps B' B', attached permanently to the slats to keep them in place, as described.

4. A rack for use in vats, consisting of a winding strap or straps, B, side straps B' B', and slats C C, the slats sliding upon the winding-strap, but being permanently attached to the side straps, and said winding strap or straps being attached at one end only to the vat, the other end being free, so that when power is applied the load will be raised to one side of the vat, as described.

5. The hoisting-machine D, provided with the pulley *d* and winding-roller *f*, and constructed with the inclined spurs *r r*, the dog or brace *s*, and the stops *v v*, as shown and described, and for the purpose specified.

In witness whereof I have hereunto signed my name in the presence of two subscribing witnesses.

J. T. GORSLINE.

Witnesses:
R. F. OSGOOD,
WM. J. MCPHERSON.